US012611934B2

(12) United States Patent
Kao

(10) Patent No.: US 12,611,934 B2
(45) Date of Patent: Apr. 28, 2026

(54) VEHICLE ELECTRONIC DEVICE, METHOD FOR PROTECTING VEHICLE ELECTRONIC DEVICE AND NON-TRANSITORY COMPUTER-READABLE STORAGE MEDIUM

(71) Applicant: Wistron Corporation, New Taipei City (TW)

(72) Inventor: Yi-Sheng Kao, New Taipei City (TW)

(73) Assignee: WISTRON CORPORATION, New Taipei City (TW)

( * ) Notice: Subject to any disclaimer, the term of this patent is extended or adjusted under 35 U.S.C. 154(b) by 199 days.

(21) Appl. No.: 18/415,842

(22) Filed: Jan. 18, 2024

(65) Prior Publication Data

US 2025/0121689 A1     Apr. 17, 2025

(30) Foreign Application Priority Data

Oct. 16, 2023     (TW) ................................. 112139470

(51) Int. Cl.
*B60L 3/00* (2019.01)
*B60L 3/12* (2006.01)

(52) U.S. Cl.
CPC ............... B60L 3/0038 (2013.01); B60L 3/12 (2013.01)

(58) Field of Classification Search
CPC ................................. B60L 3/0038; B60L 3/12
USPC ...................................................... 318/400.21
See application file for complete search history.

(56) References Cited

U.S. PATENT DOCUMENTS

| | | | | |
|---|---|---|---|---|
| 12,287,640 | B2 * | 4/2025 | Bojinov ................... | G08G 1/22 |
| 2014/0179138 | A1 * | 6/2014 | Dai ....................... | H01R 13/635 |
| | | | | 439/152 |
| 2018/0164813 | A1 * | 6/2018 | Poeppel ............... | G07C 5/0808 |
| 2020/0159969 | A1 * | 5/2020 | Shanbhogue ....... | G06F 13/4282 |
| 2021/0403016 | A1 * | 12/2021 | Jung ................... | G06F 11/1433 |
| 2021/0405994 | A1 * | 12/2021 | Takatsuna ............... | G06F 8/65 |
| 2023/0058185 | A1 * | 2/2023 | Miyake ................... | G06F 8/60 |
| 2024/0203169 | A1 * | 6/2024 | Kuehnle .............. | G07C 5/0816 |

* cited by examiner

*Primary Examiner* — Gabriel Agared
(74) *Attorney, Agent, or Firm* — McClure, Qualey & Rodack, LLP

(57) ABSTRACT

A vehicle electronic device, a method for protecting vehicle electronic device and a non-transitory computer-readable storage medium are disclosed. The vehicle electronic device includes a motherboard, a connection unit, and a protection assembly. The motherboard includes a data storage module. The connection unit is configured to capture an interface signal. The protection assembly includes a memory, a sensing component, and a processor. The memory stores a default unlocking parameter. The sensing component is configured to obtain a spatial sensing parameter when activated. In response to the connection unit losing the interface signal, the processor compares the spatial sensing parameter obtained within an unlocking time with the default unlocking parameter. In response to the spatial sensing parameter not matching the default unlocking parameter and exceeding the unlocking time, the processor generates a clear signal. The data storage module deletes at least a portion of data based on the clear signal.

20 Claims, 7 Drawing Sheets

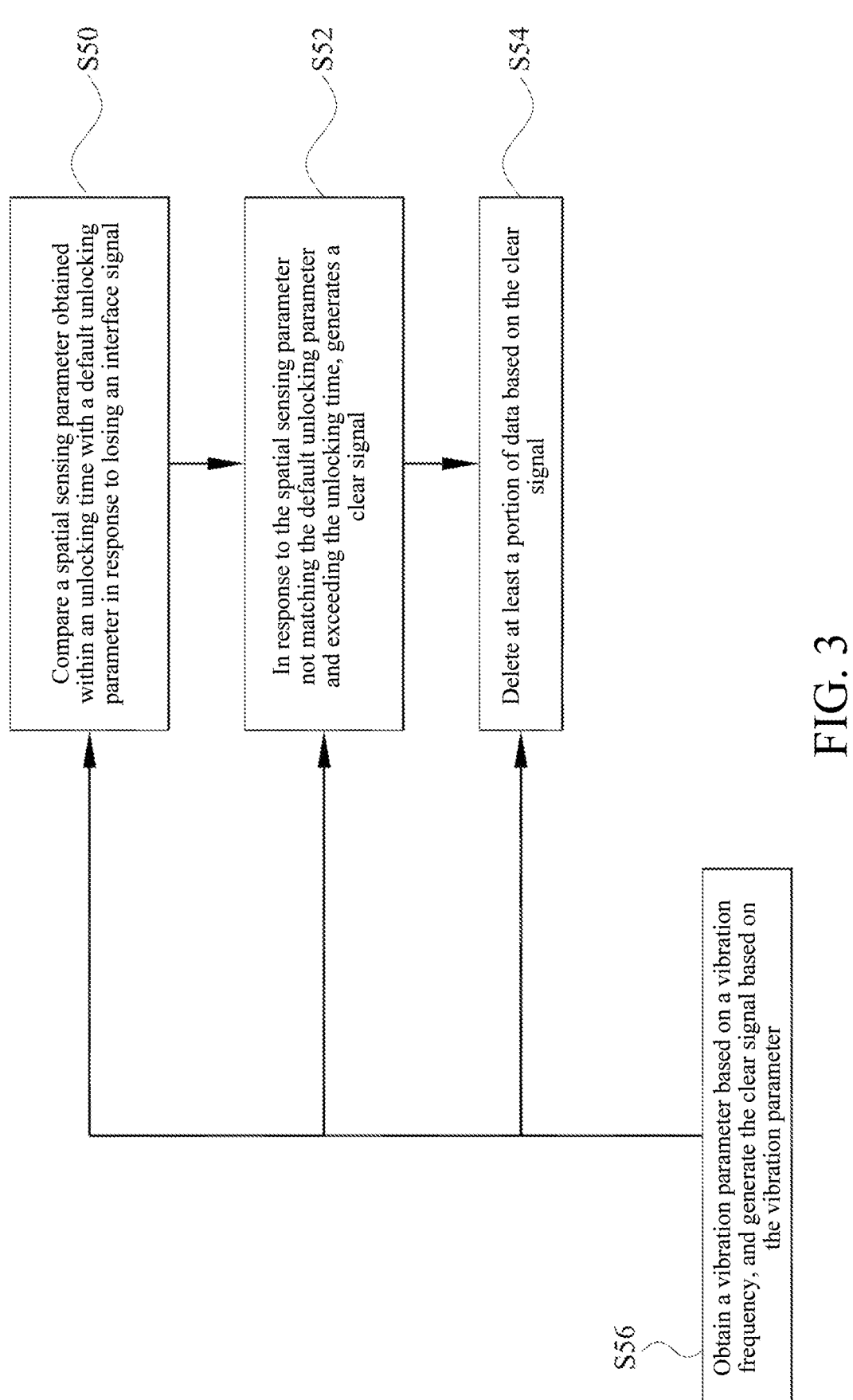

S50

Compare a spatial sensing parameter obtained within an unlocking time with a default unlocking parameter in response to losing an interface signal

S52

In response to the spatial sensing parameter not matching the default unlocking parameter and exceeding the unlocking time, generates a clear signal

S54

Delete at least a portion of data based on the clear signal

S56

Obtain a vibration parameter based on a vibration frequency, and generate the clear signal based on the vibration parameter

| Determining at least one flipping motion based on the tri-axial angle parameter and a motion analysis condition | S501 |

| Determining a corresponding operating surface for each concluded flipping motion based on an input position | S502 |

| Obtaining a sequential encoding key based on an input sequence of each operating surface | S503 |

10

A-A

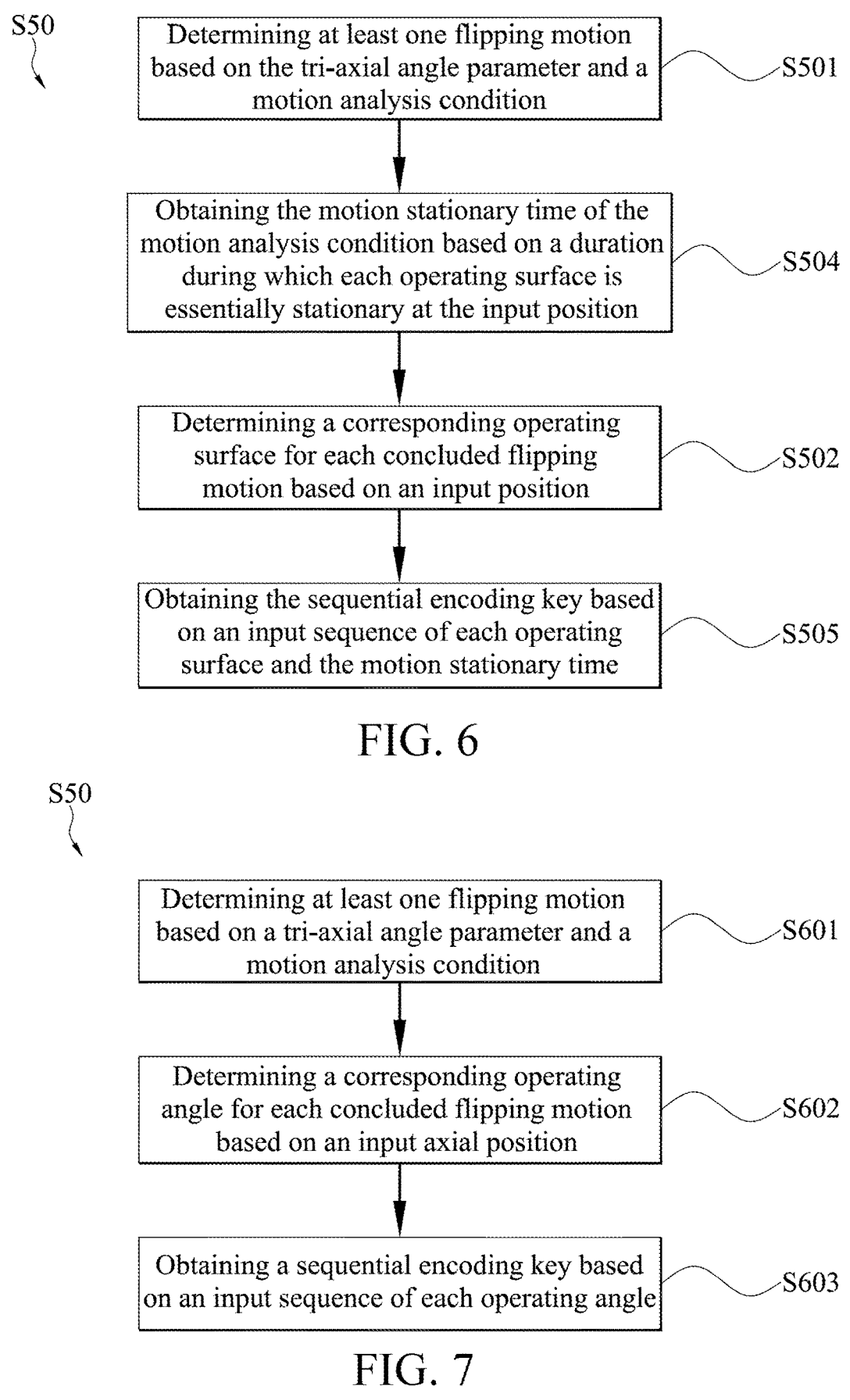

S50

Determining at least one flipping motion based on the tri-axial angle parameter and a motion analysis condition —S501

Obtaining the motion stationary time of the motion analysis condition based on a duration during which each operating surface is essentially stationary at the input position —S504

Determining a corresponding operating surface for each concluded flipping motion based on an input position —S502

Obtaining the sequential encoding key based on an input sequence of each operating surface and the motion stationary time —S505

Determining at least one flipping motion based on a tri-axial angle parameter and a motion analysis condition —S601

Determining a corresponding operating angle for each concluded flipping motion based on an input axial position —S602

Obtaining a sequential encoding key based on an input sequence of each operating angle —S603

FIG. 7

VEHICLE ELECTRONIC DEVICE, METHOD FOR PROTECTING VEHICLE ELECTRONIC DEVICE AND NON-TRANSITORY COMPUTER-READABLE STORAGE MEDIUM

CROSS-REFERENCE TO RELATED APPLICATION

This non-provisional application claims priority under 35 U.S.C. § 119(a) to Patent Application No. 112139470 filed in Taiwan, R.O.C. on Oct. 16, 2023, the entire contents of which are hereby incorporated by reference.

BACKGROUND

Technical Field

A vehicle electronic device and method and a non-transitory computer-readable storage medium are provided. When a motherboard of a vehicle electronic device is detached from a vehicle, it can be determined whether the detachment is unauthorized detachment. In a case of unauthorized detachment, at least a portion of data inside a data storage module is cleared.

Related Art

With the development of intelligent vehicles, an on-board host (referred to as a vehicle electronic device hereafter) can not only record real-time information about the vehicle but also control the vehicle's operation through the vehicle electronic device. While in use, the vehicle electronic device is connected to the vehicle, and it is only detached when data updates or maintenance are required. However, an unauthorized user may steal or modify internal data after obtaining the vehicle electronic device. Therefore, it is necessary to implement protective mechanisms for the vehicle electronic device to protect the stored data.

SUMMARY

In view of this, in some embodiments, a vehicle electronic device includes a motherboard, a connection unit, and a protection assembly. The motherboard includes a data storage module. The connection unit is coupled to the motherboard. The connection unit is configured to capture an interface signal. The protection assembly is coupled to the motherboard. The protection assembly includes a memory, a sensing component, and a processor. The memory is configured to store a default unlocking parameter. The sensing component is configured to obtain a spatial sensing parameter. The processor is coupled to the connection unit, the memory, and the sensing component. In response to the connection unit losing the interface signal, the processor compares the spatial sensing parameter obtained within an unlocking time with the default unlocking parameter. In response to the spatial sensing parameter not matching the default unlocking parameter and exceeding the unlocking time, the processor generates a clear signal. The data storage module deletes at least a portion of data based on the clear signal.

In some embodiments, a method for protecting a vehicle electronic device includes: A sensing component obtains a spatial sensing parameter. In response to losing an interface signal, a processor compares the spatial sensing parameter obtained within an unlocking time with a default unlocking parameter. In response to the spatial sensing parameter not matching the default unlocking parameter and exceeding the unlocking time, the processor generates a clear signal. A data storage module deletes at least a portion of data based on the clear signal.

In some embodiments, a non-transitory computer-readable storage medium is configured to store one or more software programs including instructions that, when executed by one or more processors, cause the one or more processors to perform operations including: obtaining, by a sensing component, a spatial sensing parameter; comparing in response to losing an interface signal, the spatial sensing parameter obtained within an unlocking time with a default unlocking parameter; generating a clear signal in response to the spatial sensing parameter not matching the default unlocking parameter and exceeding the unlocking time; and deleting at least a portion of data based on the clear signal.

In conclusion, the vehicle electronic device and method and the non-transitory computer-readable storage medium are provided in some embodiments. In the vehicle electronic device, the protection assembly is disposed on the motherboard. The protection assembly may utilize a flipping angle or flipping time of the motherboard as an unlocking condition after the vehicle electronic device is detached from a vehicle, so that the vehicle electronic device can determine whether unlocking succeeds without easily finding an unlocking manner. If the unlocking fails, the protection assembly takes proactive measures by clearing at least a portion of data inside the data storage module. This safeguard helps thwart potential data theft by unauthorized parties attempting improper unlocking techniques.

BRIEF DESCRIPTION OF THE DRAWINGS

FIG. 3 is a flowchart of a method for protecting a vehicle electronic device, according to some embodiments of the present invention;

FIG. 6 is a flowchart of a method for protecting a vehicle electronic device according to some embodiments of the present invention;

FIG. 7 is a flowchart of a method for protecting a vehicle electronic device according to some embodiments of the present invention;

DETAILED DESCRIPTION

Figure 1:
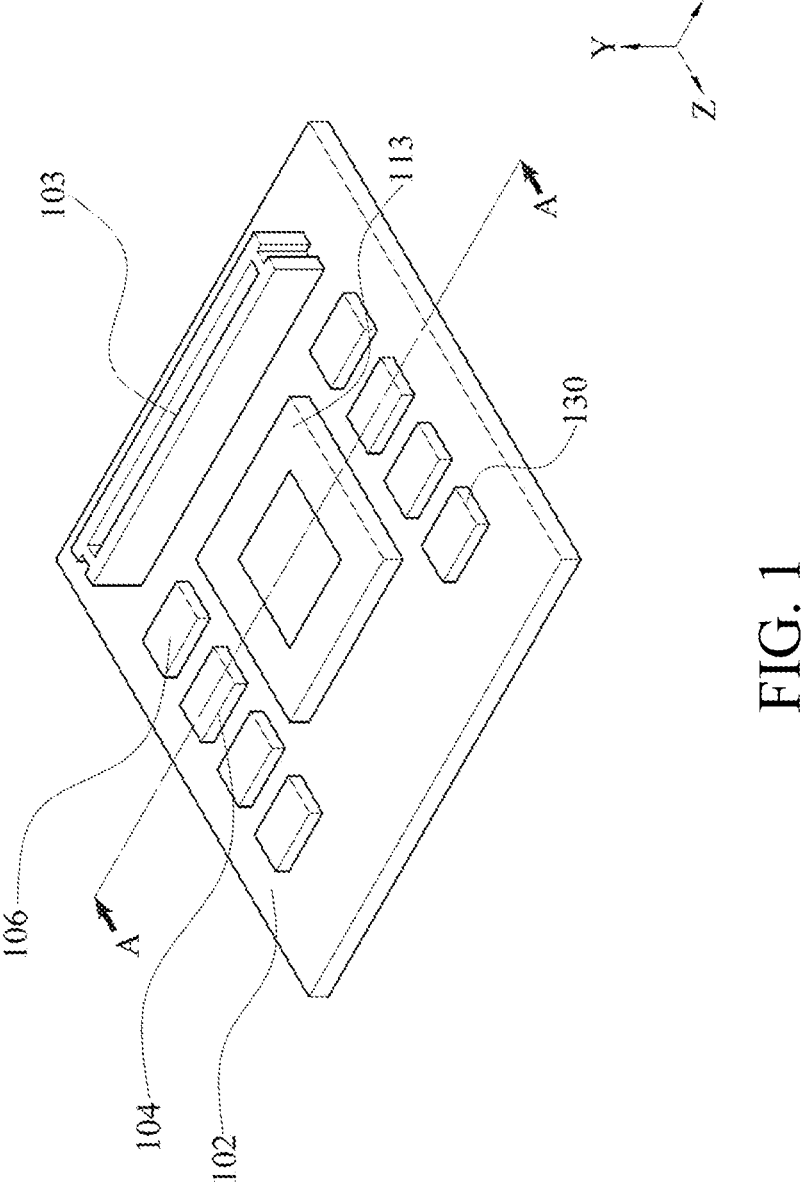
FIG. 1 is a perspective view of a vehicle electronic device, according to some embodiments of the present invention.
Figure 2:
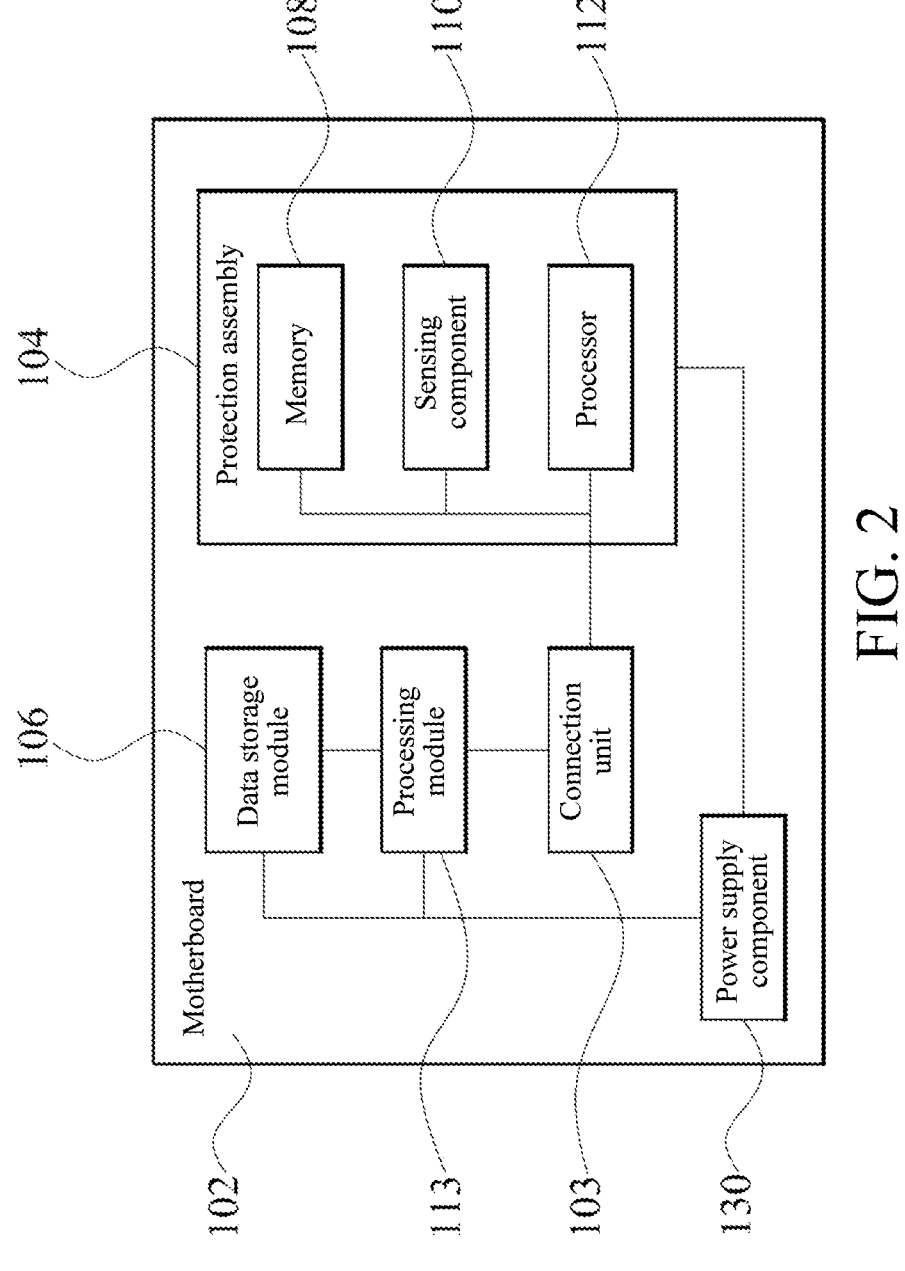
FIG. 2 is a block diagram of a vehicle electronic device, according to some embodiments of the present invention.

Refer to FIG. 1 and FIG. 2. FIG. 1 is a perspective view of a vehicle electronic device according to some embodiments of the present invention. FIG. 2 is a block diagram of a vehicle electronic device according to some embodiments of the present invention. As shown in FIG. 1 and FIG. 2, a vehicle electronic device 10 includes a motherboard 102, a connection unit 103, and a protection assembly 104. The motherboard 102 includes a data storage module 106. The connection unit 103 is coupled to the motherboard 102. The connection unit is configured to capture an interface signal. The protection assembly 104 is coupled to the motherboard 102. The protection assembly 104 includes a memory 108, a sensing component 110, and a processor 112. The memory 108 is configured to store a default unlocking parameter. The sensing component 110 is configured to obtain a spatial sensing parameter. The processor 112 is coupled to the connection unit 103, the memory 108, and the sensing component 110. The processor 112 in response to the connection unit 103 losing the interface signal, compares the spatial sensing parameter obtained within an unlocking time with the default unlocking parameter. The processor 112 in response to the spatial sensing parameter not matching the default unlocking parameter and exceeding the unlocking time, generates a clear signal. The data storage module 106 deletes at least a portion of data based on the clear signal (which is described in more detail later).

The motherboard 102 may be, for example, a circuit board of a host used in a vehicle. When the motherboard 102 remains in a state of connection with a vehicle, the vehicle can read data stored in the data storage module 106 (for example, driving data or vehicle manipulating program code). The data storage module 106 may be, but is not limited to, a volatile memory (for example, a random access memory (RAM)), a non-volatile memory (for example, a read-only memory (ROM)), a hard disk, a solid-state drive, or the like.

The connection unit 103 may be, but is not limited to, a universal serial bus (USB) interface, a personal computer (PC) card interface, a card bus, a peripheral component interconnect (PCI) interface, a peripheral component interconnect express (PCI Express), a mini-PCI interface, an IEEE interface 1394, a small computer system interface (SCSI), a personal computer memory card international association (PCMCIA) interface, an industry standard architecture (ISA) interface, an RS-232 interface, and/or the like. The connection unit 103 is connected to a connection slot of the vehicle (not shown), so that the motherboard 102 can be connected to the connection slot through the connection unit 103, and exchange data with the vehicle. After the connection unit 103 is connected to the connection slot, the connection unit 103 can generate an interface signal. Alternatively, the connection unit 103 can detect a state of connection with the connection slot. When the connection unit 103 is in the state of connection with the connection slot, the connection unit 103 generates an interface signal. Conversely, when the connection unit 103 is in a state of disconnection with the connection slot, the connection unit 103 does not generate the interface signal.

In some embodiments, the interface signal includes at least a first potential signal, a second potential signal, and at least one serial signal. The processor 112 can capture the interface signal from the connection unit 103 and determine a state of connection between the motherboard 102 and the connection slot based on a change of the interface signal. When the processor 112 does not receive the first potential signal and the second potential signal, it determines that the motherboard 102 has lost the interface signal. For example, when the motherboard 102 is connected to the connection slot, the first potential signal and the second potential signal are working voltages (the first potential signal may be I+ and the second potential signal may be I−). When the motherboard 102 is detached from the connection slot, the first potential signal and/or the second potential signal of the interface signal will disappear. The processor 112 can determine that the motherboard 102 has detached from the connection slot when losing the first potential signal and/or the second potential signal. The interface signal may also serve as an apparatus identification code for the motherboard 102, so that the motherboard 102 can perform a decoding operation with a verification module 114 to make the decoding operation more stable (which is described in more detail later in FIG. 10).

The protection assembly 104 may be disposed on the motherboard 102 to maintain electrical connection between the protection assembly 104 and the motherboard 102. When the vehicle electronic device 10 is detached from the vehicle (not shown), the protection assembly 104 may perform an unlocking algorithm (which is described in more detail later) to determine whether the detachment of the vehicle electronic device 10 is an authorized process. If the protection assembly 104 determines that the vehicle electronic device 10 is unauthorizedly detached, a clear signal may be sent to the data storage module 106, so that the data storage module 106 can clear internal data to prevent the internal data stored in the data storage module 106 from being stolen or maliciously modified. The processor 112 may be, but is not limited to, a microprocessor, a central processing unit (CPU), or a microcontroller. The protection assembly 104 performs an unlocking algorithm through the processor 112 (execution steps of the unlocking algorithm are described later) to determine whether the vehicle electronic device 10 is unauthorizedly detached, and clear at least the portion of data stored in the data storage module 106 in time.

The memory 108 may be, but is not limited to, a non-volatile memory (for example, a read-only memory (ROM)). The memory 108 can be pre-written with the default unlocking parameter, so that when the processor 112 performs the unlocking algorithm, it can extract the default unlocking parameter in memory 108 for comparison. At least a portion of the data in the data storage module 106 is cleared selectively to prevent a portion of the data in the data storage module 106 from being stolen.

The sensing component 110 may be, but is not limited to, one of a tri-axial sensor and a gyroscope or a combination thereof. The sensing component 110 may be actuated by the processor 112 to sense the spatial sensing parameter when the protection assembly 104 loses the interface signal (for example, when the motherboard 102 is detached from the vehicle). The sensing component 110 may alternatively sense the spatial sensing parameter actively after the protection assembly 104 is powered on. In some embodiments, the spatial sensing parameter includes a tri-axial angle parameter. The tri-axial angle parameter includes at least angles of an X-axis, a Y-axis, and a Z-axis.

As shown in FIG. 2, in some embodiments, the motherboard 102 further includes a processing module 113. The processing module 113 is coupled to the connection unit 103 and the data storage module 106. The processing module 113 can clear at least a portion of the data in the data storage module 106 based on the clear signal (which is described in more detail later).

Refer to FIG. 1, FIG. 2, and FIG. 3. FIG. 3 is a flowchart of a method for protecting a vehicle electronic device according to some embodiments of the present invention. As shown in FIG. 1 to FIG. 3, steps of the processor 112 performing the unlocking algorithm are as follows:

Step S50: The processor 112 compares a spatial sensing parameter obtained within an unlocking time with a default unlocking parameter in response to losing an interface signal.

Step S52: The processor 112 in response to the spatial sensing parameter not matching the default unlocking parameter and exceeding the unlocking time, generates a clear signal.

Step S54: The data storage module 106 deletes at least a portion of data based on the clear signal.

"The processor 112 compares a spatial sensing parameter obtained within the unlocking time with a default unlocking parameter in response to losing an interface signal" in step S50 may mean that the connection unit 103 does not generate the interface signal when the motherboard 102 is detached from the connection slot. In this case, the processor 112 cannot capture the interface signal from the connection unit 103 (in other words, the processor 112 loses the interface signal), so that the processor 112 can compare the spatial sensing parameter obtained within the unlocking time with the default unlocking parameter. The default unlocking parameter includes at least parameters such as an angle and/or time. The unlocking time may mean time that the motherboard 102 is detached from the connection slot and the motherboard 102 is stationary (which may mean that the tri-axial angle parameter of the sensing component 110 does not change). Within the unlocking time, the processor 112 can receive the spatial sensing parameter obtained by the sensing component 110. The processor 112 compares the spatial sensing parameter obtained within the unlocking time with the default unlocking parameter. The unlocking time may alternatively mean time from the connection unit 103 losing the interface signal to the connection unit 103 generating the interface signal again (for example, the connection unit 103 loses the interface signal after the motherboard 102 is detached from the vehicle, and the interface signal is generated again after the connection unit 103 is connected to the verification module 114). In addition, it should be noted that the unlocking time can be set based on a quantity of groups of a flipping angle of the motherboard 102 in the default unlocking parameter. For example, if the motherboard 102 needs to be flipped three predefined orientation angles within the unlocking time, the unlocking time may be set to 10 seconds, but it is not limited to this.

In some embodiments, in step S50, the processor 112 in response to losing an interface signal and no change in the tri-axial angle parameter, compares the spatial sensing parameter obtained within the unlocking time with the default unlocking parameter. Before the motherboard 102 is unlocked, the motherboard 102 can be placed stably, so that after the tri-axial angle parameter of the motherboard 102 is stationary for a period of time, the processor 112 begins to capture the spatial sensing parameter.

"The processor 112 in response to the spatial sensing parameter not matching the default unlocking parameter and exceeding the unlocking time, generates a clear signal" in step S52 may mean that spatial sensing parameters received by the processor 112 sequentially during the unlocking time are compared with the default unlocking parameter. When a comparison result is that the default unlocking parameter is same as a received spatial sensing parameter, the processor 112 determines that unlocking succeeds. The processor 112 does not generate the clear signal when the unlocking is succeeds. Conversely, when the comparison result is that the default unlocking parameter is different from a received spatial sensing parameter, the processor 112 determines that unlocking fails. The processor 112 generates and sends the clear signal when the unlocking fails.

"The data storage module 106 deletes at least a portion of data based on the clear signal" in step S54 may mean that the processing module 113 of the motherboard 102 receives the clear signal to clear at least the portion of data stored in the data storage module 106, may mean that after receiving the clear signal, the processor 112 of protection assembly 104 clears at least the portion of data stored in the data storage module 106, or may mean that after the data storage module 106 receives the clear signal, the data storage module 106 actively clears at least the portion of stored data. In this way, the data stored in the data storage module 106 is to be deleted when the unlocking fails, so that an external device cannot steal the data.

Figure 4:
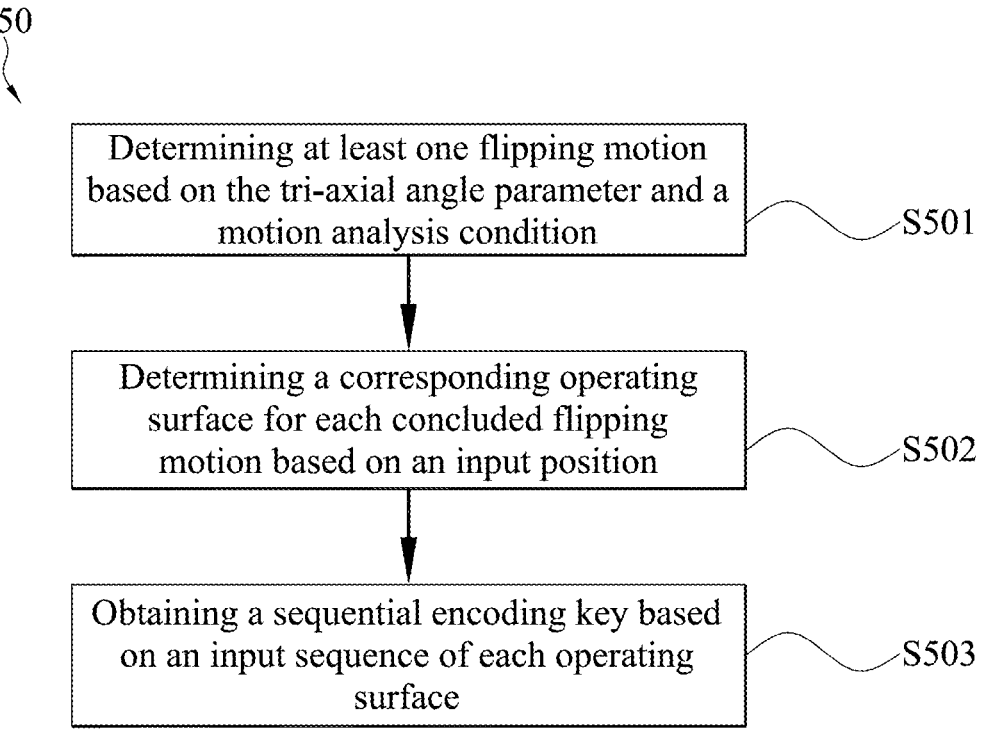
FIG. 4 is a flowchart of a method for protecting a vehicle electronic device according to some embodiments of the present invention.
Figure 5:
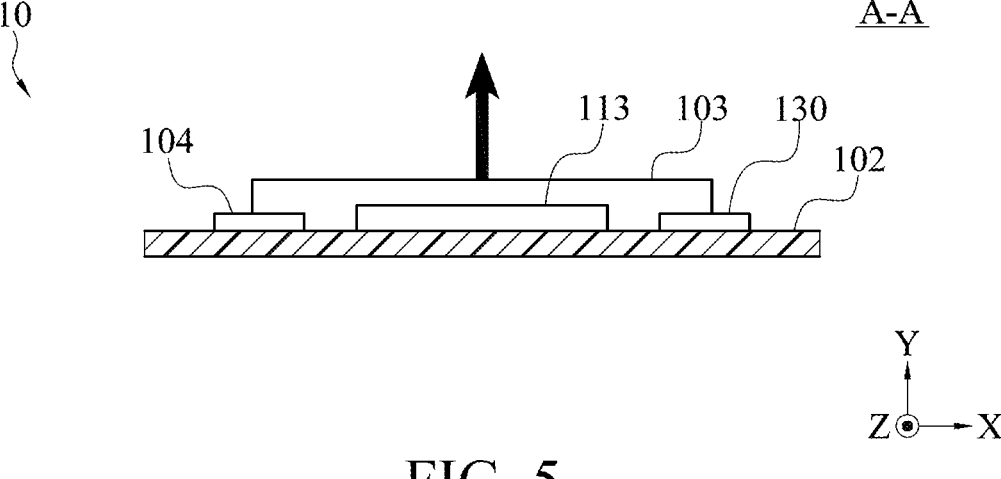
FIG. 5 is a cross-sectional view of a vehicle electronic device in an A-A direction, according to some embodiments of the present invention, showing that one of the operating surfaces of a motherboard faces an input position.

Refer to FIG. 4 and FIG. 5. FIG. 4 is a flowchart of a method for protecting a vehicle electronic device according to some embodiments of the present invention. FIG. 5 is a cross-sectional view of a vehicle electronic device in an A-A direction according to some embodiments of the present invention, showing that one of the operating surfaces of a motherboard faces an input position. In some embodiments, step S50 further includes: determining at least one flipping motion based on the tri-axial angle parameter and a motion analysis condition, where the motion analysis condition includes a cumulative angle change value (step S501); determining a corresponding operating surface for each concluded flipping motion based on an input position (step S502); and obtaining a sequential encoding key based on an input sequence of each operating surface (step S503).

In step S501, after the motherboard 102 is flipped to a specific angle, the processor 112 determines whether the motherboard 102 completes one flipping motion based on a cumulative angle change value in a period of time. The cumulative angle change value may refer to a cumulative value of changes in the flipping angle of the motherboard 102. Specifically, the processor 112 may analyze angle changes of the motherboard 102 during a flipping process, that is, the sensing component 110 detects angles in each axis based on different flip directions of the motherboard 102 within a period of time (for example, in a positive direction or a negative direction of a particular axis). The processor 112 may accumulate angles along a same axis (a cumulative value can be considered as the cumulative angle change value). A sum of the cumulative angles of each axis may be positive (clockwise) or negative (anti-clockwise).

When the motherboard 102 is flipped in a specific direction, the angle changes continue to increase. When the motherboard 102 is not flipped, the angle changes may vary between a positive direction and a negative direction. In this case, the cumulative angle change value approaches 0 and is less than the cumulative angle change value during flip. In some embodiments, the processor 112 may set an analysis time interval to be every 300 ms. The processor 112 may analyze the angle changes of the motherboard 102 every 300 ms. If the processor 112 calculates the cumulative angle change value less than 0.05°/s, the processor 112 determines that the motherboard 102 does not perform the flipping motion (in other words, the motherboard 102 is in a non-flipping state). It should be noted that the cumulative angle change value and the analysis time interval are not limited to this. If the sensing component 110 senses that the tri-axial angle parameter of the motherboard 102 and a cumulative angle change value in a period of time are greater than or equal to an angle threshold (for example, an angle change of the motherboard 102 is great), the processor 112 determines that the motherboard 102 performs the flipping motion. Conversely, if the sensing component 110 senses that the tri-axial angle parameter of the motherboard 102 and in response to the cumulative angle change value in a period of time being less than the angle threshold (for example, an angle change of the motherboard 102 is slight), the processor 112 determines no flipping motion of the motherboard. The processor 112 calculates a tri-axial angle parameter between a case of performing the flipping motion and a case of not performing the flipping motion of the motherboard 102 and a cumulative angle change value during time of the flipping state and the non-flipping state to determine that the motherboard 102 completes one flipping motion.

In step S502, the processor 112 determines that the motherboard 102 completes one flipping motion, and the processor 112 determines the operating surface of the motherboard 102 facing the input position based on the input position. Specifically, the input position may refer to one of absolute positions of the motherboard 102, such as above, below, left, right, front, or rear of the motherboard 102. In FIG. 5, a positive Y-axis direction of motherboard 102 is used as the input position. In some embodiments, the processor 112 may determine the operating surface of the motherboard 102 corresponding to the input position based on the tri-axial angle parameter of the motherboard 102. For example, the motherboard 102 may pre-define a tri-axial angle parameter of the operating surface. When the motherboard 102 completes one flipping motion, the processor 112 may determine an operating surface facing the input position based on the tri-axial angle parameter of the motherboard 102.

In step S503, the processor 112 may obtain a sequential encoding key based on a sequence in which each operating surface of the motherboard 102 faces the input position. Specifically, each operating surface of the motherboard 102 is defined with a distinct sequential encoding key. For example, a sequential encoding key of the operating surface above the motherboard 102 may be set to "1", a sequential encoding key of the operating surface below the motherboard 102 may be set to "2", a sequential encoding key of the operating surface on a left side of the motherboard 102 may be set to "3", a sequential encoding key of the operating surface on a right side of the motherboard 102 may be set to "4", a sequential encoding key of the operating surface in front of the motherboard 102 may be set to "5", and a sequential encoding key of the operating surface behind the motherboard 102 may be set to "6". In this way, the processor 112 may generate a sequential encoding key based on the sequence in which the operating surface of the motherboard 102 face the input position after each flipping motion of the motherboard 102. For example, a flipping sequence of the motherboard 102 is "up", "down", "left", and "right", and the processor 112 may obtain a sequential encoding key "[1, 2, 3, 4]" based on the flipping sequence of the motherboard 102. It should be noted that a recording form of the sequential encoding key is not limited to this, and any data format that can be read by a computer may be implemented.

In some embodiments, step S52: In response to default unlocking parameter being inconsistent with the sequential encoding key and exceeding the unlocking time, the processor 112 generates a clear signal. It should be noted that after obtaining the sequential encoding key within the unlocking time, the processor 112 may compare the sequential encoding key with the default unlocking parameter. If the default unlocking parameter is inconsistent with the sequential encoding key, it indicates that unlocking fails, and the processor 112 generates the clear signal. Conversely, if the default unlocking parameter is consistent with the sequential encoding key, it indicates that unlocking succeeds, and data in the data storage module 106 can be read and cannot be cleared.

Refer to FIG. 2, FIG. 3, and FIG. 6. FIG. 6 is a flowchart of a method for protecting a vehicle electronic device according to some embodiments of the present invention. As shown in FIG. 2, FIG. 3, and FIG. 6, in some embodiments, a motion analysis condition includes a motion stationary time. An execution step of the unlocking algorithm further includes: obtaining the motion stationary time of the motion analysis condition based on a duration during which each operating surface is essentially stationary at the input position (step S504). It should be noted that step S504 may be performed successively in any step between step S501 and step S503. In Step S504, the processor 112 may calculate time that after any operating surface of the motherboard 102 faces the input position, the operating surface faces the input position until the motherboard 102 performs a next flipping motion. The time that is substantial stationary (substantial stationary may indicate that a change of a tri-axial angle does not exceed a specific range or may be determined based on the cumulative angle change value or exclusion of an abnormal surge signal) at the input position is defined as the motion stationary time.

In some embodiments, step S503 further includes: obtaining the sequential encoding key based on the input sequence of each operating surface and the motion stationary time (step S505). In step S505, the processor 112 may generate the sequential encoding key based on the sequence that the operating surface of the motherboard 102 faces the input position after the motherboard 102 performs each flipping motion as well as the motion stationary time. For example, a flipping sequence of the motherboard 102 is "up", "down", "left", and "right", and the motherboard 102 has the motion stationary time of "2 seconds" on the operating surface below. Therefore, the processor 112 may obtain a sequential encoding key "[1, 2, 2 seconds, 3, 4]". In this way, the processor 112 uses the operating surface and the time as unlocking conditions, and unlocking variability thereof is greatly improved. Even if an unauthorized user knows that the motherboard 102 has a protection mechanism, probability of the vehicle electronic device 10 being successfully cracked can be greatly reduced.

Figure 8:
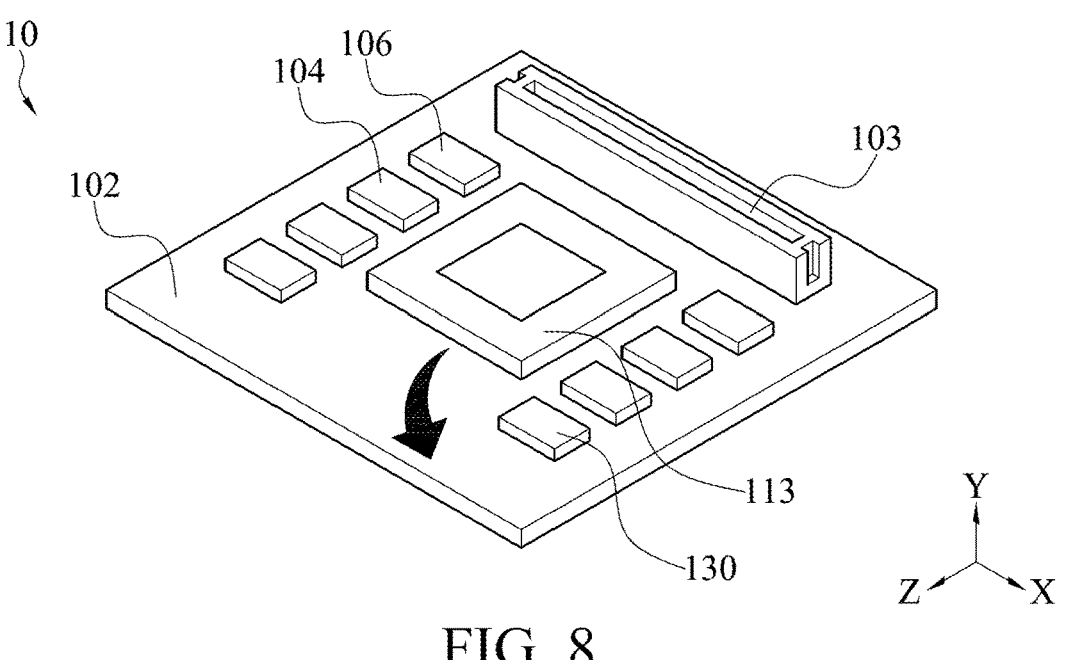
FIG. 8 is a schematic diagram of a side view of a vehicle electronic device, according to some embodiments of the present invention, showing an angle change of a motherboard in an input axial position.

Refer to FIG. 7 and FIG. 8. FIG. 7 is a flowchart of a method for protecting a vehicle electronic device according to some embodiments of the present invention. FIG. 8 is a schematic diagram of a side view of a vehicle electronic device according to some embodiments of the present invention, showing an angle change of a motherboard in an input axial position. In some embodiments, step S50 further includes: determining at least one flipping motion based on the tri-axial angle parameter and a motion analysis condition, where the motion analysis condition includes a cumulative angle change value (step S601); determining, based on an input axial position, a corresponding operating angle for each concluded flipping motion (step S602); and obtaining a sequential encoding key based on an input sequence of each operating angle (step S603).

In step S601, after the motherboard 102 is flipped to any angle, the processor 112 determines whether the motherboard 102 completes one flipping motion based on the cumulative angle change value in a period of time. If the sensing component 110 senses that the tri-axial angle parameter of the motherboard 102 and the cumulative angle change value in a period of time are greater than or equal to an angle threshold (for example, an angle change of the motherboard 102 is great), the processor 112 determines that the motherboard 102 performs the flipping motion. Conversely, if the sensing component 110 senses that the tri-axial angle parameter of the motherboard 102 and in response to the cumulative angle change value being less than the angle threshold (for example, an angle change of the motherboard 102 is slight), the processor 112 determines no flipping motion of the motherboard 102. In addition, the processor 112 may sense substantial stationary time after the motherboard 102 is flipped until a next flipping motion begins. The stationary time is determined by a change of the tri-axial angle parameter or when the cumulative angle change value does not change until it changes again. The time that is substantial stationary may be defined as the motion stationary time.

In step S602, within the unlocking time, the processor 112 may determine a flipping angle of the motherboard 102 in each input axial position based on a tri-axial angle parameter that is of the motherboard 102 and is obtained by the sensing component 110 in either axis direction (X-axis, Y-axis, or Z-axis). For example, the motherboard 102 is flipped to 135 degrees in a negative X-axis direction.

In step S603, the processor 112 may generate the sequential encoding key based on an angle flipping sequence and the motion stationary time of each operating angle in the corresponding input axial position after each flipping motion of the motherboard 102. For example, the flipping sequence of the motherboard 102 is: turn 135 degrees in the negative X-axis direction and stay for 1 second, turn 45 degrees in a negative Z-axis direction, and finally turn 360 degrees in the negative X-axis direction. The processor 112 may obtain a sequential encoding key "[X-135, 1 second, Z-45, X-360]" based on the flipping sequence of the motherboard 102.

Figure 9:
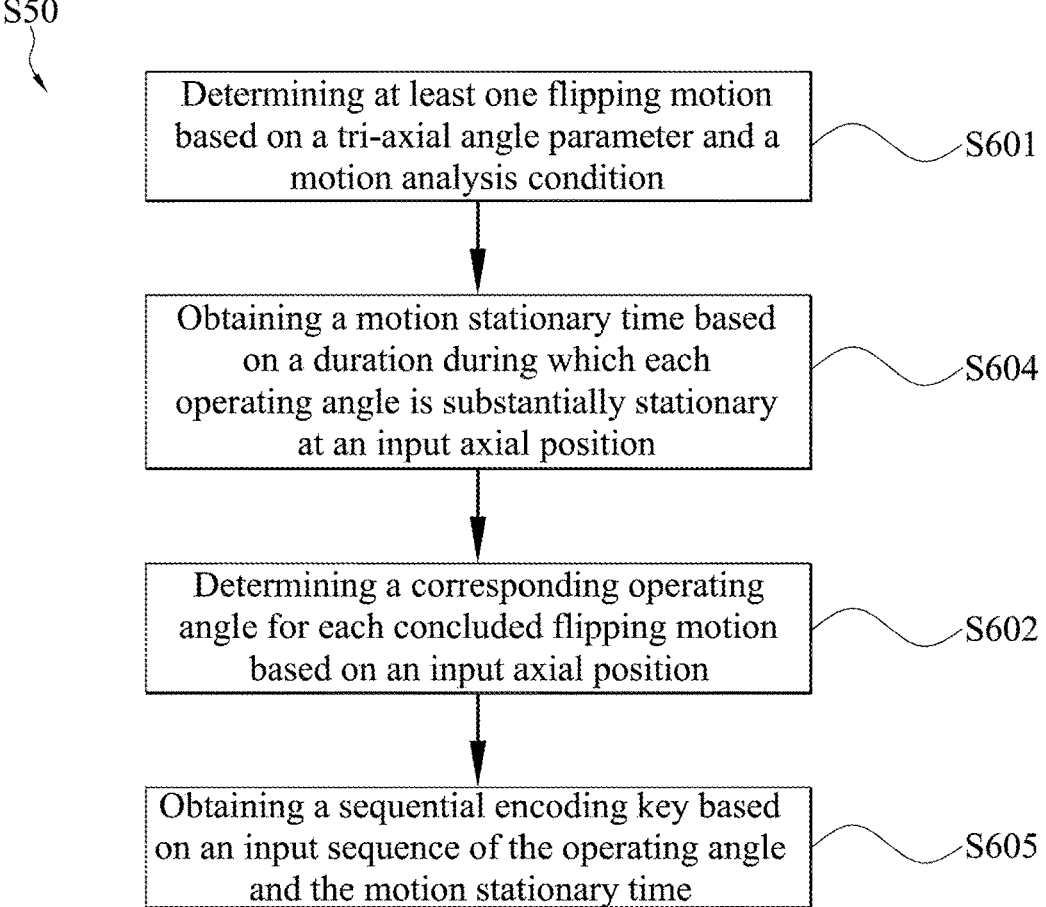
FIG. 9 is a flowchart of a method for protecting a vehicle electronic device, according to some embodiments of the present invention.

Refer to FIG. 2, FIG. 3, and FIG. 9. FIG. 9 is a flowchart of a method for protecting a vehicle electronic device according to some embodiments of the present invention. In some embodiments, an execution step of the processor 112 further includes: obtaining the motion stationary time based on a duration during which each operating angle is substantially stationary at the input axial position (step S604). It should be noted that step S604 may be performed successively in any step between step S601 and step S603. In step S604, the processor 112 may calculate substantial stationary time after the motherboard 102 is flipped until a next flipping motion begins. The stationary time may be determined based on a change of the tri-axial angle parameter or that the cumulative angle change value does not change until it changes again. The time that is substantial stationary may be defined as the motion stationary time.

In some embodiments, step S603 further includes: obtaining the sequential encoding key based on the input sequence of each operating angle and the motion stationary time (step S605). In step S605, the processor 112 may generate the sequential encoding key based on the sequence in which the operating angle of the motherboard 102 faces the input axial position after the motherboard 102 performs each flipping motion as well as the motion stationary time. For example, the flipping sequence of the motherboard 102 is: turn 135 degrees in the negative X-axis direction and the motion stationary time is "2 seconds", turn 45 degrees in the negative Z-axis direction, and finally turn 360 degrees in the negative X-axis direction. Therefore, the processor 112 may obtain a sequential encoding key "[X-135, 2 seconds, Z-45, X-360]". In this way, the processor 112 uses the angle and the time as unlocking conditions.

In some embodiments, the motion analysis condition further includes the cumulative angle change value and angle movement time. For example, the processor 112 may use every 10-degree flip of the motherboard 102 as a progressive base, so that the vehicle electronic device 10 has fault tolerance space when being unlocked, and does not need to be accurately flipped to a specified angle. The angle movement time may refer to time that the motherboard 102 is flipped from a previous operating angle to a next operating angle. In some embodiments, step S603 further includes: obtaining the sequential encoding key based on the input sequence of each operating angle, the motion stationary time, the cumulative angle change value, and the angle movement time (step S605). In this way, in addition to comparing the input sequence and the motion stationary time of the operating angle, the processor 112 may also add restrictions on the cumulative angle change value and angle movement time to increase difficulty of unlocking.

Figure 10:
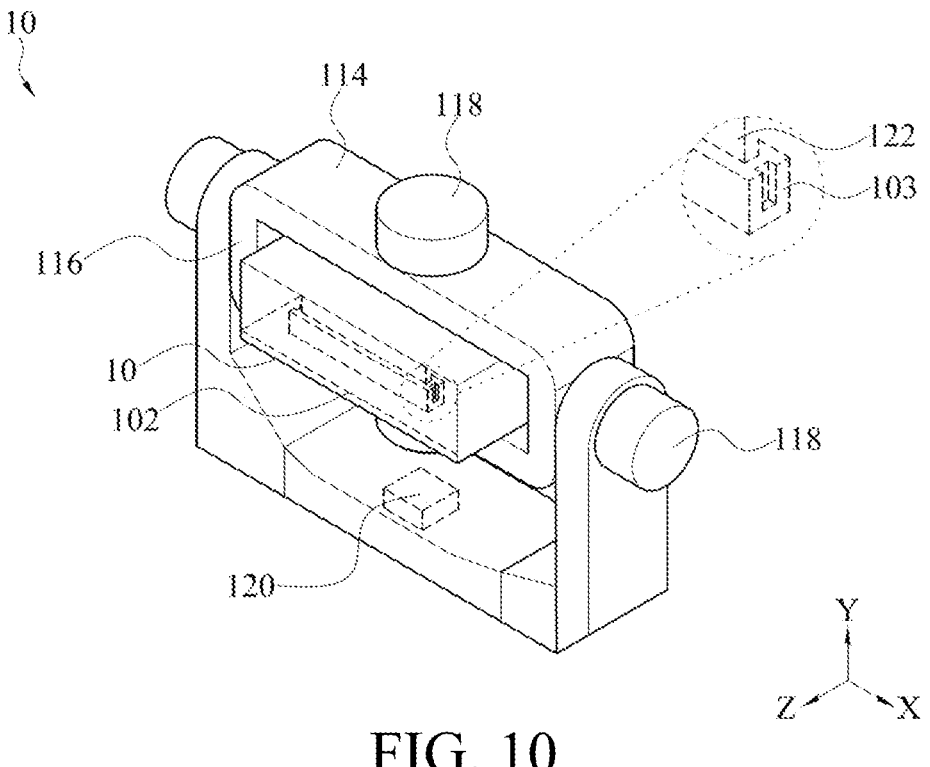
FIG. 10 is a schematic diagram of a vehicle electronic device fixed to a verification module, according to some embodiments of the present invention.

Refer to FIG. 10. FIG. 10 is a schematic diagram of a vehicle electronic device fixed to a verification module according to some embodiments of the present invention. As shown in FIG. 2 and FIG. 10, in some embodiments, the vehicle electronic device 10 further includes a verification module 114. The verification module 114 includes a mounting frame 116, a steering assembly 118, and a processing unit 120. The mounting frame 116 fixes the vehicle electronic device 10. Specifically, the mounting frame 116 may be a housing that fixes the vehicle electronic device 10 (refer to a first housing 124 in FIG. 11). If the vehicle electronic device 10 does not have a housing, the mounting frame 116 may fix (carry) the motherboard 102. The steering assembly 118 is connected to the mounting frame 116, and the steering assembly 118 is configured to flip the mounting frame 116 based on at least one steering signal. The processing unit 120 is configured to generate at least one steering signal based on a default unlocking parameter. Specifically, after the motherboard 102 is detached from the vehicle, the verification module 114 may automatically unlock the motherboard 102. An external device (for example, a cloud server, computer device, or handheld electronic device) may send the default unlocking parameter to the verification module 114, so that the processing unit 120 encodes the default unlocking parameter as a steering signal to control the steering assembly 118 to perform a flipping motion based on the steering signal. In this way, the verification module 114 may accurately flip the motherboard 102 to a specified operating angle.

As further shown in FIG. 10, in some embodiments, the verification module 114 further includes a connection slot 122. The connection slot 122 is coupled to the connection unit 103. The connection unit 103 generates an interface signal when being connected to the connection slot 122. The processing unit 120 is configured to obtain at least one steering signal based on the interface signal. The steering assembly 118 is configured to flip the mounting frame 116 based on at least one steering signal. It should be noted that at least one steering signal corresponds to the default unlocking parameter. The processing unit 120 may find a corresponding default unlocking parameter based on the interface signal, and generate the steering signal based on the default unlocking parameter. In this embodiment, after the connection unit 103 is connected to the connection slot 122, the verification module 114 verifies whether the interface signal is correct apparatus identification code, and the motherboard 102 generates the steering signal only when it is determined that the interface signal is a correct apparatus identification code.

Figure 11:
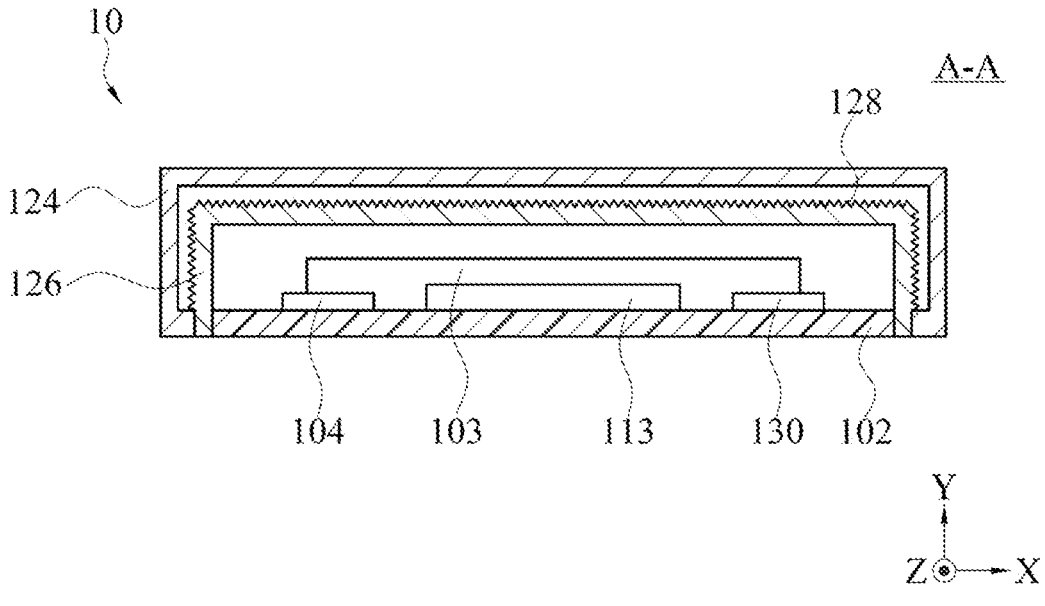
FIG. 11 is a cross-sectional view of a vehicle electronic device in an A-A direction, according to some embodiments of the present invention, showing that a first housing and a second housing cover a motherboard.

Refer to FIG. 11. FIG. 11 is a cross-sectional view of a vehicle electronic device in an A-A direction according to some embodiments of the present invention, showing that a first housing and a second housing cover a motherboard. As shown in FIG. 11, in some embodiments, the vehicle electronic device 10 further includes a first housing 124 and a second housing 126. The first housing 124 covers the motherboard 102. The second housing 126 is located between the first housing 124 and the motherboard 102. The second housing 126 has a zigzag unit structure 128. The zigzag unit structure 128 is configured to generate a vibration frequency when vibrating. In response to the sensing component 110 detecting the vibration frequency and obtaining a vibration parameter, the processor 112 generates a clear signal.

The first housing 124 may cover the motherboard 102 to protect the motherboard 102 from external damage. The first housing 124 may be made of a robust material (such as a metal). The first housing 124 may be fixed to the motherboard 102 with at least one fastener, or be fixed to the motherboard 102 with a set of screws. The second housing 126 may be, but is not limited to, a galvanized sheet so that the second housing can shield electromagnetic waves to protect the motherboard 102 from electromagnetic interference. The zigzag unit structure 128 is disposed on a surface of the second housing 126 facing the first housing 124. When continuous external force is applied to the zigzag unit structure 128, the zigzag unit structure 128 may generate a specific vibration frequency. The vibration frequency may be determined based on a material of the zigzag unit structure 128. The vibration frequency may be between 1 KHz and 2 KHz.

For example, when a drilling machine drills through the first housing 124 and touches the second housing 126, the zigzag unit structure 128 vibrates due to force of the drilling machine. In response to the sensing component 110 detecting the vibration frequency and generates the vibration parameter. The processor 112 may generate the clear signal when receiving the vibration parameter to clear at least a portion of data in the data storage module 106. In this way, the protection assembly 104 may first clear at least the portion of data in the data storage module 106 without being detected by an unauthorized user.

As further shown in FIG. 3, in some embodiments, the method for protecting a vehicle electronic device further includes: The sensing component 110 obtains the vibration parameter based on the vibration frequency. The processor 112 generates the clear signal based on the vibration parameter (step S56). Step S56 may be performed before, during, or after any of the foregoing steps, so that the protection assembly 104 may clear at least the portion of data in the data storage module 106 after the sensing component 110 senses the vibration frequency.

As further shown in FIG. 2, in some embodiments, the vehicle electronic device 10 further includes a power supply component 130. The power supply component 130 is coupled to the motherboard 102 and the protection assembly 104 to supply power to the motherboard 102 and the protection assembly 104. Specifically, the power supply component 130 may be, but is not limited to, a battery, so that the power supply component may supply power independently. In this way, when the motherboard 102 is detached from the vehicle, the protection assembly 104 may still be independently powered by the power supply component 130 to continue to determine an unlocking operation or to clear at least the portion of data in the data storage module 106.

In some embodiments, a non-transitory computer-readable storage medium is configured to store one or more software programs that include instructions which, when executed by one or more processes, cause the one or more processors to perform operations including: obtaining, by the sensing component, a spatial sensing parameter; comparing, in response to losing an interface signal, the spatial sensing parameter obtained within an unlocking time with a default unlocking parameter; generating a clear signal in response to the spatial sensing parameter not matching the default unlocking parameter and exceeding the unlocking time; and deleting at least a portion of data based on the clear signal.

In conclusion, the vehicle electronic device and method and the non-transitory computer-readable storage medium are provided in some embodiments. The vehicle electronic device 10 includes a motherboard 102 and a protection assembly 104. When the motherboard 102 is detached from a vehicle, a sensing component 110 may sense a tri-axial angle parameter of the motherboard. A processor 112 may encode a captured tri-axial angle parameter and/or the motion stationary time into a set of sequential encoding keys within the unlocking time. The processor 112 may compare a sequential encoding key with the default unlocking parameter. If the default unlocking parameter and the sequential encoding key match, it is determined that unlocking succeeds. Conversely, if the default unlocking parameter and the sequential encoding key do not match, it is determined that the unlocking fails. In addition, when the default unlocking parameter and the sequential encoding key do not match, the processor 112 may generate the clear signal to clear at least a portion of data in the data storage module 106, thereby preventing the data in the data storage module 106 from being stolen.

What is claimed is:

1. A vehicle electronic device, comprising:
a motherboard, comprising a data storage module;
a connection unit, coupled to the motherboard, wherein the connection unit is configured to capture an interface signal; and
a protection assembly, coupled to the motherboard, and comprising:
a memory, configured to store a default unlocking parameter;
a sensing component, configured to obtain a spatial sensing parameter; and
a processor, coupled to the connection unit, the memory, and the sensing component, wherein the processor is configured to:
in response to the connection unit losing the interface signal, compare the spatial sensing parameter obtained within an unlocking time with the default unlocking parameter; and
in response to the spatial sensing parameter not matching the default unlocking parameter and exceeding the unlocking time, generate a clear signal, wherein the data storage module deletes at least a portion of data based on the clear signal.

2. The vehicle electronic device according to claim 1, wherein in response to the connection unit losing the interface signal, the processor is configured to:

receive the spatial sensing parameter, wherein the spatial sensing parameter comprises a tri-axial angle parameter;

determine at least one flipping motion based on the tri-axial angle parameter and a motion analysis condition, wherein the motion analysis condition comprises a cumulative angle change value;

determine a corresponding operating surface for each concluded flipping motion based on an input position;

obtain a sequential encoding key based on an input sequence of each operating surface; and in response to the default unlocking parameter being inconsistent with the sequential encoding key and exceeding the unlocking time, generate the clear signal.

3. The vehicle electronic device according to claim 2, wherein the motion analysis condition further comprises a motion stationary time, and the processor is further configured to:

obtain the motion stationary time based on a duration during which each operating surface is essentially stationary at the input position; and wherein the step of obtaining a sequential encoding key based on an input sequence of each operating surface further comprises:

obtaining the sequential encoding key based on the input sequence of each operating surface and the motion stationary time.

4. The vehicle electronic device according to claim 3, wherein in response to the cumulative angle change value being less than an angle threshold, the processor determines no flipping motion of the motherboard.

5. The vehicle electronic device according to claim 1, wherein the interface signal comprises a first potential signal, a second potential signal, and at least one serial signal; and the processor determines the loss of the interface signal in response to not receiving the first potential signal and the second potential signal.

6. The vehicle electronic device according to claim 1, wherein in response to the connection unit losing the interface signal, the processor is configured to:

receive the spatial sensing parameter, wherein the spatial sensing parameter comprises a tri-axial angle parameter;

determine at least one flipping motion based on the tri-axial angle parameter and a motion analysis condition, wherein the motion analysis condition comprises a motion stationary time;

determine a corresponding operating angle for each concluded flipping motion based on an input axial position;

obtain a sequential encoding key based on an input sequence of each operating angle; and in response to the default unlocking parameter being inconsistent with the sequential encoding key and exceeding the unlocking time, generate the clear signal.

7. The vehicle electronic device according to claim 6, wherein the motion analysis condition further comprises a cumulative angle change value and an angle movement time; and the processor obtains the sequential encoding key based on the input sequence of each operating angle, the cumulative angle change value, and the angle movement time.

8. The vehicle electronic device according to claim 7, wherein the processor is further configured to:

obtain the motion stationary time based on a duration during which each operating angle is essentially stationary at the input axial position, wherein

14 the step of obtaining a sequential encoding key based on an input sequence of each operating angle further comprises:

obtaining the sequential encoding key based on the input sequence of each operating angle and the motion stationary time.

9. The vehicle electronic device according to claim 1, further comprising a verification module, wherein the verification module comprises:

a processing unit, configured to obtain at least one steering signal based on the interface signal;

a mounting frame, configured to fix the vehicle electronic device; and a steering assembly, connecting the mounting frame and the processing unit, wherein the steering assembly is configured to flip the mounting frame based on at least one steering signal.

10. The vehicle electronic device according to claim 1, further comprising:

a first housing, covering the motherboard; and a second housing, located between the first housing and the motherboard, wherein the second housing has a zigzag unit structure, and the zigzag unit structure is configured to generate a vibration frequency when vibrating; wherein in response to the sensing component detecting the vibration frequency and obtaining a vibration parameter, the processor generates the clear signal.

11. The vehicle electronic device according to claim 10, wherein the vibration frequency of the zigzag unit structure is between 1 KHz and 2 KHz.

12. A method for protecting a vehicle electronic device, comprising:

obtaining, by a sensing component, a spatial sensing parameter;

comparing, by a processor, in response to losing an interface signal, the spatial sensing parameter obtained within an unlocking time with a default unlocking parameter;

generating, by the processor, a clear signal in response to the spatial sensing parameter not matching the default unlocking parameter and exceeding the unlocking time; and deleting, by a data storage module, at least a portion of data based on the clear signal.

13. The method for protecting the vehicle electronic device according to claim 12, wherein the step of the processor comparing the spatial sensing parameter obtained within the unlocking time with the default unlocking parameter in response to losing the interface signal further comprises:

determining at least one flipping motion based on a tri-axial angle parameter of the spatial sensing parameter and a motion analysis condition, wherein the motion analysis condition comprises a cumulative angle change value;

determining a corresponding operating surface for each concluded flipping motion based on an input position; and obtaining a sequential encoding key based on an input sequence of each operating surface; and the step of the processor generating the clear signal in response to the spatial sensing parameter not matching the default unlocking parameter and exceeding the unlocking time further comprises:

in response to the default unlocking parameter being inconsistent with the sequential encoding key and exceeding the unlocking time, the processor generates the clear signal.

14. The method for protecting the vehicle electronic device according to claim 13, wherein the motion analysis condition further comprises a motion stationary time; and the method for protecting the vehicle electronic device further comprises:

obtaining the motion stationary time of the motion analysis condition based on a duration during which each operating surface is essentially stationary at the input position; wherein the step of obtaining a sequential encoding key based on an input sequence of each operating surface further comprises:

obtaining the sequential encoding key based on the input sequence of each operating surface and the motion stationary time.

15. The method for protecting the vehicle electronic device according to claim 14, wherein in response to the cumulative angle change value being less than an angle threshold, the processor determines no flipping motion of the motherboard.

16. The method for protecting the vehicle electronic device according to claim 12, wherein the step of the processor comparing the spatial sensing parameter obtained within the unlocking time with the default unlocking parameter in response to losing the interface signal, further comprises:

determining at least one flipping motion based on a tri-axial angle parameter of the spatial sensing parameter and a motion analysis condition, wherein the motion analysis condition comprises a cumulative angle change value and a motion stationary time;

determining, based on an input axial position, a corresponding operating angle for each concluded flipping motion; and obtaining a sequential encoding key based on an input sequence of each operating angle; and the step of the processor generating the clear signal in response to the spatial sensing parameter not matching the default unlocking parameter and exceeding the unlocking time further comprises:

in response to the default unlocking parameter being inconsistent with the sequential encoding key and exceeding the unlocking time, the processor generates the clear signal.

17. The method for protecting the vehicle electronic device according to claim 16, wherein the step of determining at least one flipping motion based on the tri-axial angle parameter of the spatial sensing parameter and the motion analysis condition further comprises:

obtaining the motion stationary time based on a duration during which each operating angle is essentially stationary at the input axial position;

wherein the step of obtaining the sequential encoding key based on the input sequence of each operating angle further comprises:

obtaining the sequential encoding key based on the input sequence of each operating angle and the motion stationary time.

18. The method for protecting the vehicle electronic device according to claim 17, wherein the motion analysis condition further comprises the cumulative angle change value and an angle movement time; and the step of obtaining the sequential encoding key based on the input sequence of each operating angle further comprises:

obtaining the sequential encoding key based on the input sequence of the operating angle, the motion stationary time, the cumulative angle change value, and the angle movement time.

19. The method for protecting the vehicle electronic device according to claim 12, further comprising:

obtaining, by the sensing component, a vibration parameter based on a vibration frequency; and generating, by the processor, the clear signal based on the vibration parameter.

20. A non-transitory computer-readable storage medium configured to store one or more software programs including instructions that, when executed by one or more processors, cause the one or more processors to perform operations including:

obtaining, by a sensing component, a spatial sensing parameter;

comparing in response to losing an interface signal, the spatial sensing parameter obtained within an unlocking time with a default unlocking parameter;

generating a clear signal in response to the spatial sensing parameter not matching the default unlocking parameter and exceeding the unlocking time; and deleting at least a portion of data based on the clear signal.

* * * * *